United States Patent [19]
Schneck et al.

[11] Patent Number: 6,108,583
[45] Date of Patent: *Aug. 22, 2000

[54] ADAPTIVE DATA SECURITY SYSTEM AND METHOD

[75] Inventors: Phyllis A. Schneck, Potomac, Md.; Karsten Schwan, Tucker, Ga.; Santosh Chokhani, Arlington, Va.

[73] Assignee: Georgia Tech Research Corporation, Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 09/181,304

[22] Filed: Oct. 28, 1998

Related U.S. Application Data

[60] Provisional application No. 60/063,551, Oct. 28, 1997.

[51] Int. Cl.$^7$ ............................. G05B 15/02; G05B 19/18
[52] U.S. Cl. ...................... 700/9; 700/7; 700/8; 700/68; 700/67; 709/229; 709/230; 709/213; 713/186; 713/187; 713/188
[58] Field of Search ............................... 380/1, 2, 26, 30; 713/186, 187, 188; 700/2, 8, 9, 68, 67; 709/229, 230, 213

[56] References Cited

U.S. PATENT DOCUMENTS

| | | | |
|---|---|---|---|
| 4,771,391 | 9/1988 | Blasbalg | 364/514 |
| 4,965,827 | 10/1990 | McDonald | 380/25 |

(List continued on next page.)

OTHER PUBLICATIONS

Meyer, et al., "MPEG–FAQ 4.1," Security Mechanisms for Multimedia–Data with the Example MPEG–I–Project, Project Description of SECMPEG, 1995, pp. 1–2.

Jha, et al., "Adaptive Resource Allocation for Embedded Parallel Applications," Proceedings of the Third International Conference on High Performance Computing, Dec. 1996.

Ivan–Rosu, et al., "Improving Protocol Performance by Dynamic Control of Communication Resources," Proceedings of the $2^{nd}$ IEEE Conference on Complex Computer Systems (ICECCS), Oct. 1996.

Rosu, et al., "On Adaptive Resource Allocation for Complex Real–Time Applications," Proceedings of the 18th IEEE Real–Time Systems Symposium (RTSS), IEEE, 1997.

Schneck, et al., "DRRM: Dynamic Resource Reservation Manager," International Conference on Computer Communications and Networks, IEEE, 1996.

(List continued on next page.)

*Primary Examiner*—Paul P. Gordon
*Assistant Examiner*—Ramesh Patel
*Attorney, Agent, or Firm*—Thomas, Kayden, Horstemeyer & Risley, L.L.P.

[57] ABSTRACT

A system and method for data communication with adaptive security in which a send host transmits a data stream to a receive host in packets which contain an authentication data block with an authentication header and a signature block. The authentication header advantageously contains various fields including a verification type, a security algorithm, a minimum security level, a target security level, and an actual security level. The receive host adaptively performs verification of the data packets using varying security levels based in part on the availability of security operations per second (SOPS) in the receive host. Where a data stream in the receive host is delayed by a security processing bottleneck, the receive host may alter the verification type, security algorithm, or the actual security level to speed up the processing of the data stream by reducing the amount of security processing performed. The receive host further allocates the SOPS among the data streams received based on a priority assigned to each data stream.

34 Claims, 8 Drawing Sheets

U.S. PATENT DOCUMENTS

| | | | |
|---|---|---|---|
| 5,005,137 | 4/1991 | Ernst | 364/514 |
| 5,107,415 | 4/1992 | Sato et al. | 395/800 |
| 5,477,531 | 12/1995 | McKee et al. | 370/17 |
| 5,481,735 | 1/1996 | Mortensen et al. | 395/200.1 |
| 5,490,252 | 2/1996 | Macera et al. | 395/200.01 |
| 5,511,122 | 4/1996 | Atkinson | 380/25 |
| 5,541,852 | 7/1996 | Eyuboglu et al. | 364/514 C |
| 5,544,322 | 8/1996 | Cheng et al. | 395/200.12 |
| 5,550,984 | 8/1996 | Gelb | 395/200.17 |
| 5,566,310 | 10/1996 | Mathewson, II | 395/200.13 |
| 5,586,260 | 12/1996 | Hu | 395/200.2 |
| 5,590,197 | 12/1996 | Chen et al. | 380/24 |
| 5,623,601 | 4/1997 | Vu | 395/187 |
| 5,627,970 | 5/1997 | Keshav | 2395/200.13 |
| 5,627,972 | 5/1997 | Shear | 395/200.18 |
| 5,642,360 | 6/1997 | Trainin | 370/230 |
| 5,689,566 | 11/1997 | Nguyen | 380/25 |
| 5,715,397 | 2/1998 | Ogawa et al. | 395/200.18 |
| 5,727,159 | 3/1998 | Kikinis | 395/200.76 |
| 5,737,535 | 4/1998 | Bagley et al. | 395/200.57 |
| 5,761,438 | 6/1998 | Sasaki | 395/200.77 |
| 5,764,921 | 6/1998 | Banham et al. | 395/200.77 |
| 5,768,536 | 6/1998 | Strongin et al. | 395/200.77 |
| 5,784,571 | 7/1998 | Mantopoulos et al. | 395/200.77 |
| 5,784,572 | 7/1998 | Rostoker et al. | 395/200.77 |
| 5,784,578 | 7/1998 | Galloway et al. | 395/285 |
| 5,793,763 | 8/1998 | Mayes et al. | 370/389 |

OTHER PUBLICATIONS

Waldsperger, et al., "Lottery Scheduling: Flexible Proportional–Share Resource Management," Operating Systems Review, 1994, pp. 1–12.

Agi, et al., "An Empirical Study of Secure MPEG Video Transmissions," IEEE, Mar. 1996, pp. 1–8.

Li, et al., "Security Enhanced MPEG Player," Department of Computer Science, Unviersity of Illinois at Urbana–Champaign, 1996.

Nahrstedt, et al., "Resource Management in Networked Multimedia Systems," Handbook of Multimedia Networking, Auerbach Publications, 1995, pp. 381–405.

Needham, et al., "Using Encryption for Authentication in Large Networks of Computers," Communications of the ACM, vol. 21, No. 12, Dec. 1978, pp. 210–216.

Reiter, et al., "A security Architecture for Fault–Tolerant Systems," ACM Transactions on Computer Systems, vol. 12, No. 4, Nov. 1994, pp. 340–371.

Larry L. Peterson, "OS Support for High–Speed Networking," http://www.cs.arizona.edu/xkernel/projects/cryptography–and–protocols, pp. 1–11.

Hudson, et al., "Techniques for Addressing Fundamental Privacy and Disruption Tradeoffs in Awareness Support Systems," Proceedings of the ACM 1996 Conference on Computer Supported Cooperative Work, pp. 248–257.

Varadharajan, et al., "A Practical Approach to Design and Management of Secure ATM Networks," Jul. 1997 pp. 213–232.

Rumen Stainov, "Dynamic Protocol Configuration for Multimedia Networks," Microprocessing and Microprogramming, 38, 1993, pp. 741–748.

ADAPTIVE DATA SECURITY SYSTEM AND METHOD

CROSS-REFERENCE TO RELATED APPLICATIONS

This application claims priority to and the benefit of copending U.S provisional patent application entitled "Authenticast: Adaptive Protocol to Enable Strong Authentication in High-Performance Applications" filed on Oct. 28, 1997 and accorded Ser. No. 60/063,551, which is incorporated herein by reference.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of DAAH04-96-1-0209 awarded by the U.S. Department of Defense.

TECHNICAL FIELD

The present invention is generally related to the field of data communications and, more particularly, is related to a system and method for securing data communication.

BACKGROUND OF THE INVENTION

Currently there is an exponential increase in the number of banks and other businesses that use the Internet to conduct transactions. The Internet is often a less expensive and less time consuming business medium than paper or the telephone. Electronic commerce and data interchange are increasing efficiency and giving companies a competitive edge in the global economy. With this growth in Internet electronic commerce, it becomes essential that greater security be provided for network-enabled transactions and collaboration.

The demand for information security is further elevated by the increasing prevalence of virtual private networks (VPNs), which are configurations by which private business is conducted over public media, such as the Internet. Sharing an existing public communications infrastructure is far more cost-effective than building a separate network for every business. However, security is required to create this "private" logical network over existing public wire. To create this VPN, security operations are invoked at both the source and destination nodes to ensure properties such as confidentiality, integrity, and authentication, for proof of origination and non-repudiation, of data.

Although some Internet commerce applications have been developed, they do not provide sufficiently strong security for trusted transfer of private data over a public medium. The very essence of strong security is the notion that the security medium employed to protect data cannot be compromised in a sufficiently short time to allow use or alteration of those data by an unauthorized party. Therefore, data protection mechanisms for strong security are required to be complex, and they thus have a high computation overhead which detracts from overall application performance. In the interest of performance, security procedures are often omitted. If Internet commerce applications are to succeed, they cannot compromise performance or security. In the best possible case, security mechanisms would be transparent to users. However, so far, security in the world wide web security is poor. It is relatively few vendors that can delivery invisible security. The inherent tradeoffs in realizing both security and performance comprise the challenge we face in providing them.

In addition, law enforcement officials are becoming increasingly dependent on the availability of real-time, network collaborative and shared applications. For example, police officers are assisted by real-time photos and data delivered directly to their vehicles. This often requires strong authentication measures which are admissible in court as proof of origin, identity, and integrity of certain data and electronic evidence. The ability to dynamically vary levels of authentication to match available resources and current requirements provides users of law enforcement applications options to employ strong security and use data as evidence while still receiving these data in a timely manner. This option was previously unavailable.

In addition, the healthcare industry is another example of a business relying heavily on shared or collaborative applications to provide greater customer service. For example, electronic communications infrastructures such as the Internet facilitate and expedite potentially worldwide collaboration on x-ray images or case studies. These materials, however, contain personal data, and for patient privacy and safety, are often required to be encrypted, for confidentiality and/or authenticated, for identification of the image. Again, security is necessary for these applications that enable the networked collaboration, yet the security could be detrimental if it hampers the speed with which the information can be used to help the patient.

SUMMARY OF THE INVENTION

The present invention provides a system and method for facilitating adaptive security between a send host and a receive host. Briefly described, in architecture, the system includes a send host having a processor coupled to a data bus, a memory coupled to the data bus, an input device coupled to the data bus to input a desired security configuration for a data stream to be communicated to a receive host, and an output device coupled to the data bus to display the desired and actual security configurations for the data stream on an output display, the actual security configuration generally being received from the receive host. The processor operates according to adaptive security logic stored on the memory which includes logic to generate a plurality of data packets associated with the data stream, the data packets including an authentication data block with an authentication header containing the actual security configuration and a signature.

The system further includes a receive host which comprises a processor, memory, data input, and data output, all coupled to a data bus. The data input is configured to receive at least one data stream comprising a number of data packets, the data packets including an authentication data block having an authentication header and a signature. The processor runs according to adaptive security logic stored on the memory. The adaptive security logic includes logic to decompose an authentication header in the data packets, logic to perform a variable percentage verification on the data packets from the data stream, and logic to determine an actual verification percentage performed based on a number of available security operations, a minimum verification threshold, and a desired verification target, the minimum verification threshold and the desired verification target being contained in the authentication header. The adaptive security logic also includes logic to verify the data packets using delayed verification techniques.

The present invention can also be viewed as providing a method for communicating a data stream employing adaptive security. In this regard, the method can be broadly summarized by the following steps:

identifying a desired verification type, a desired security algorithm, a minimum security level, and a target security level in a send host for communicating a data stream from the send host to a receive host;

determining an actual verification type, an actual security algorithm, and an actual security level in the receive host based on the desired verification type, desired security algorithm, minimum security level, target security level, and an availability of a number of security operations per second (SOPS);

communicating the actual verification type, the actual security algorithm, and the actual security level from the receive host to the send host;

generating a plurality of data packets associated with the data stream in the send host, the data packets having an authentication data block with an authentication header, the authentication header containing the actual verification type, actual security algorithm, minimum security level, target security level, and the actual security level;

verifying the data packets on a percentage basis if the actual verification type is percentage based verification, the percentage based verification being performed at the actual security level which is greater or equal to the minimum security level and less than or equal to the target security level; and performing a delayed verification on the data packets if the actual verification type is delayed verification.

The present invention has numerous advantages, a few of which are delineated hereafter as merely examples. An advantage of the invention is that it facilitates more effective data security by allowing a receive host to adapt the security level at which a data stream is verified based upon the availability of host processor resources to provide security operations per second (SOPS) in the receive host. In this manner, data streams received by the receive host are not delayed or lost due to a security processing bottleneck which can occur if multiple incoming data streams stress the security operation capacity of a particular receive host.

Other advantages of the invention include that it is user friendly, robust and reliable in operation, efficient in operation, and easily implemented for mass commercial production.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
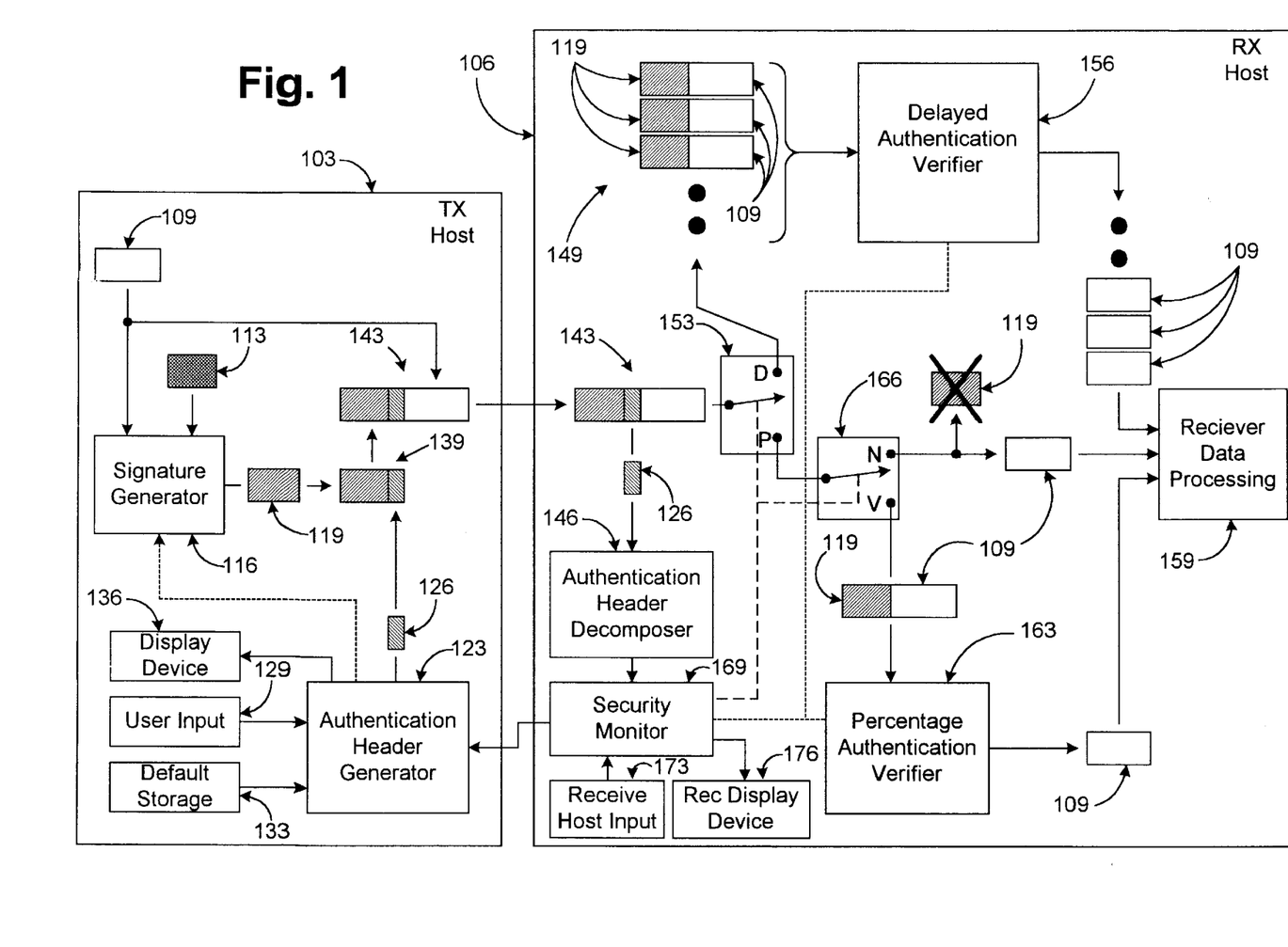
FIG. 1 is a functional block diagram of an data security system according to an embodiment of the present invention.

Turning to FIG. 1, shown is a functional block diagram of an authentication system 100 according to an embodiment of the present invention. The authentication system 100 includes at least one send host 103 and a receive host 106. Although only a single send host 103 is shown, it is understood that multiple send hosts 103 may communicate with the receive host 106, the single send host 103 being shown for purposes of the following discussion. Likewise, the single send host 103 may communicate with multiple receive hosts 106, the single receive host 106 being shown for purposes of the following discussion as well. Additionally, multiple send hosts 103 may communicate with multiple receive hosts 106.

The send host 103 generates a data block 109 or receives the data block 109 from a separate source to be communicated to the receive host 106. Generally, the data block 109 is of a predetermined length and may be formed, for example, from a continuous data stream or data file received by the send host 103. The data block 109 is formed as the data payload in a packet to be communicated to the receive host 106 as will be discussed.

The data block 109 may include any type of data such as, for example, but not limited to, audio, video, or other computer data. The send host 103 also includes a key 113 which may be a block of data of predetermined length as is known in the art. The key 113 may be a private key for signing the data, or a public key for encrypting the data as known in the art. Note that other keys may be employed to accommodate different authentication or encryption algorithms.

The send host 103 includes a signature generator 116 which generates a signature block 119 from the data block 109 and the key 113 using a predetermined security algorithm which may be, for example, but not limited to, a security algorithm such as the Digital Signature Algorithm (DSA), the Rivest-Shamir-Adleman (RSA) algorithm, or secret key authentication, which are generally known in the art.

The send host 103 also includes an authentication header generator 123 which generates an authentication header 126. The authentication header 126 includes various data fields, such as, for example, an authentication sequence number, data frame size, frame type, security algorithm, verification type, minimum security level, target security level, and an actual security level. The receive host 106 employs these data fields to generate an actual security configuration to achieve authentication of a data stream communicated from the send host 103. The actual security configuration is dynamic in that it may be changed by either the send host 103 or the receive host 106 during the course of data communication therebetween in response to user or application requirements, or changes in computer resource availability as will be discussed.

The authentication header generator 123 may receive a desired security configuration from the user input 129 or a default desired configuration may be received from a default storage 133 for a particular data stream. The desired security configuration is displayed on a display device 136 along with the actual security configuration which may ultimately be determined by the receive host 106 depending upon the specific desired security configuration specified by the user. Upon system startup, the default desired security configuration is obtained from the default storage 133 and displayed on the display device 133. A user may then alter the desired security configuration via the user input 129.

The authentication header generator 123 generates the authentication header 126 which contains the actual security configuration to be placed in an authentication data block 139. Together, the data block 109 and the authentication data block 139 make up a data packet 143 which is communicated to the receive host 106. The data stream is thus a continuous stream of "signed" data packets 143, each data packet 143 containing an authentication data block 139 with an authentication header 126 and a signature block 119. It may also be possible, however, that the data stream may only contain a predetermined percentage of "signed" data packets 143 as desired by the user. The security configuration identified in the authentication header 126 is initially determined from the desired security specification and may be altered based on feedback received from the receive host 106. Note that the user may alter the desired security specification after data communication is commenced between the send host 103 and the receive host 106. The receive host 106 may also alter the actual security configuration based on the operating state of the receive host 106, the altered security configuration being displayed to the user on the display device 133.

The receive host 106 receives the data packet 143 and the authentication header 126 is decomposed in an authentication header decomposer 146 in which the above stated fields are separated from the data packet 143 for use by the receive host 106. The receive host 106 then attempts to execute the desired security verification configuration contained in the authentication header 126. The receive host 106 may employ one of several verification types. In the preferred embodiment, two specific verification types are used, namely, delayed authentication verification and percentage based verification, although other verification types may be employed as well.

When delayed authentication is employed, a predetermined number of signature blocks 119 and corresponding data blocks 109 from the data packets 143 received are collected in a bundle 149 as indicated by a first functional switch 153 which is placed in the D position. Thereafter, the delay authentication verifier 156 operates on the bundle 153 and verifies the data blocks 109 contained therein together using appropriate hashing functions known by those skilled in the art. Delayed verification will verify one hundred percent of the data packets. Once verified, the data blocks 119 are then provided to the receive data processor 159 for further processing according to the specific application. Delayed authentication is almost always available as a verification option, even when security processing resources are limited as delayed authentication exploits hashing techniques that reduce a large amount of data to a relatively small amount which can be verified rather quickly. However, there is a greater probability of processing delay due to data corruption as many data blocks are verified at once, which means that a single corrupted data block would require the entire data block to be retransmitted for verification.

When percentage based verification is employed, a predetermined percentage of signature blocks 119 and corresponding data blocks 109 from the data packets 143 are accessed by a percentage authentication verifier 163 as indicated by the first functional switch 149 being placed in the P position. A second functional switch 166 provides access to a particular signature block 119 and corresponding data block 109 upon which verification is performed when in the V position. Otherwise, when the second functional switch 166 is in the N position, the data block 109 is passed on to the receive data processor 159 without verification, the signature block 119 being discarded as shown. After a particular data block is verified by the percentage authentication verifier 163, the verified data block 109 is provided to the receive data processor for further processing according to the specific application. Note that the frequency or actual security level at which the second functional switch 166 provides access to the signature blocks 119 and corresponding data blocks 109 is determined by the security monitor 169. Generally, the security levels as discussed herein refer to the percentage of verified data packets in the receive host 106. The security monitor 169 also determines the verification type as indicated by the first functional switch 153, as well as the specific security algorithm employed by both the delayed authentication verifier 156 and the percentage authentication verifier 163.

The security monitor 169 attempts to specify an actual verification type, actual security algorithm, and an actual security level according to the desired security configuration received from the send host 103. However, the receive host 106 may not have enough processor time or security operations per second (SOPS) to provide the desired security configuration due to the verification of other data streams which currently employ much if not all of the SOPS available in the receive host 106 at a given moment. Consequently, the security monitor 169 may force a change in the verification type, security algorithm, and/or the actual security level that differs from the desired security configuration received by the send host 103 in order to accommodate the data stream.

In order to change the security algorithm employed, the security monitor 169 sends the new security algorithm to be employed to the send host 103 via a return path, the authentication header generator 123 implementing the new security algorithm while changing the authentication header to indicate the new security algorithm appropriately. The security algorithm is changed in this manner because the generation of the signature block 119 is performed by the send host 103.

Likewise, a change in the verification type is effected by the security monitor 169 by sending the new verification type to the send host 103 via the return path. The new verification type is then placed in the authentication header 126 by the authentication header generator 123. When a data packet 143 containing the new verification type reaches the receive host 103, then the security monitor causes the first functional switch 153 to move to the D position to employ delayed authentication verification in synch with the incoming data packets 143 earmarked for such verification type.

A change in the actual security level when percentage based verification is employed may occur in the receive host 106 or the send host 103. In the receive host 106, the actual security level is raised or lowered based upon the number of SOPS available in the receive host 106. It is understood that a lower security level requires a correspondingly lower number of SOPS to implement and vice versa. Note that the actual security level is not lowered below a predetermined minimum security level which is identified in the authentication header 126 so as to maintain a minimum amount of security. The actual security level determined by the security monitor 169 is communicated to the send host 103 for display on the display device 136.

The actual security level may be changed by the send host 103 by the user. Specifically, the user may adjust the actual security level via the user input 129. If the user adjusts the actual security level to a point which the receive host 106 is unable to maintain due to a lack of SOPS availability, the receive host 106 may generally react by switching to delayed verification in which one hundred percent of the data packets are verified as delayed verification can generally be performed with a minimal number of SOPS due to the hashing functions employed.

Note that when the receive host 106 alters any security parameter due to a lack of available SOPS, the receive host 106 may store the previous desired parameters in memory so that the receive host may revert back to the previous desired parameters when SOPS become available. These parameters may include, but are not limited to, the desired verification type and the desired security algorithm.

The receive host 106 includes a receive host input 173 in which a user may alter the actual security parameters manually. The receive host 106 displays the desired and actual security configuration on the receive display device 173 to be viewed by the user.

Note that the functionality of the send host 103 and the receive host 106 as described above and in the following discussion may be resident in a single computer system which may act as a send host 103 or a receive host 106 at any given time, depending upon whether the user is sending or receiving data. Further, a single computer system may simultaneously act as a send host 103 and a receive host 106 at the same time, communicating one or more data streams to a number of destination data endpoints and receiving one or more data streams from other origination data endpoints.

All of the above functionality discussed herein is implemented at a user/application level as known in the art which provides a distinct advantage as the present invention may be employed regardless of the underlying physical layer such as a network.

Figure 2:
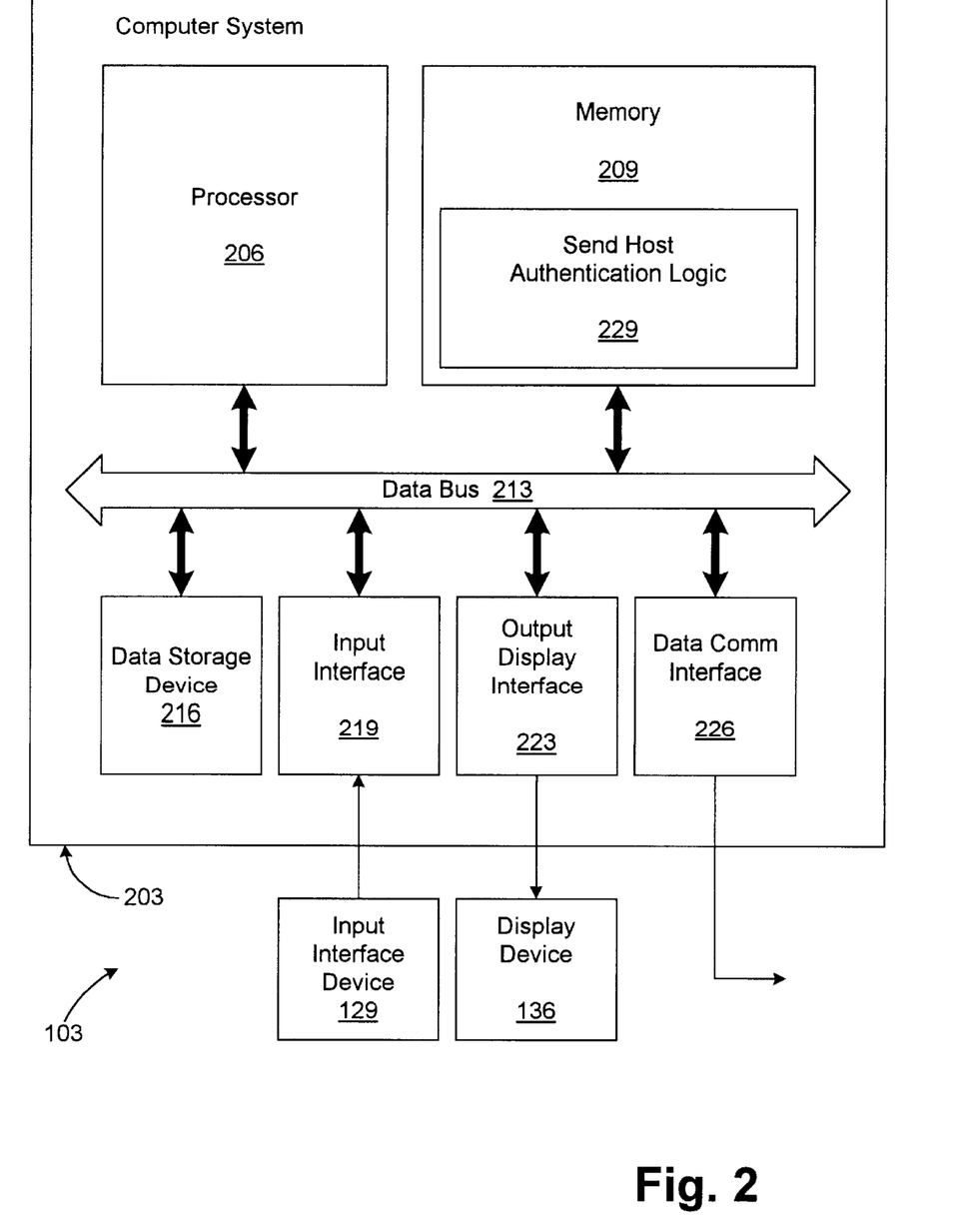
FIG. 2 is a block diagram of the send host of FIG. 1.

Referring next, to FIG. 2, shown is block diagram of the send host 103 according to an example embodiment of the present invention. The send host 103 includes a computer system 203 with a processor 206 and a memory 209 which are electrically coupled to a data bus 213. Also electrically coupled to the data bus 213 are a data storage device 216, an input interface 219, an output display interface 223, and a data communication interface 226. The input interface module 219 in turn is electrically coupled to a user input interface device 129 such as a keyboard, mouse, or other suitable device. Likewise, the output display interface 223 is electrically coupled to an output display device 136 such as a cathode ray tube (CRT) or suitable display device. The data storage device 216 may be a hard drive, floppy disk drive, fixed memory device, or other suitable means of data storage. The data communication interface 226 allows the send host 103 to communicate with the receive host 106 (FIG. 1) via a data communications channel (not shown). In performing the various tasks as discussed herein, the processor 206 operates according to the send host authentication logic 229 stored on the memory 209.

Figure 3:
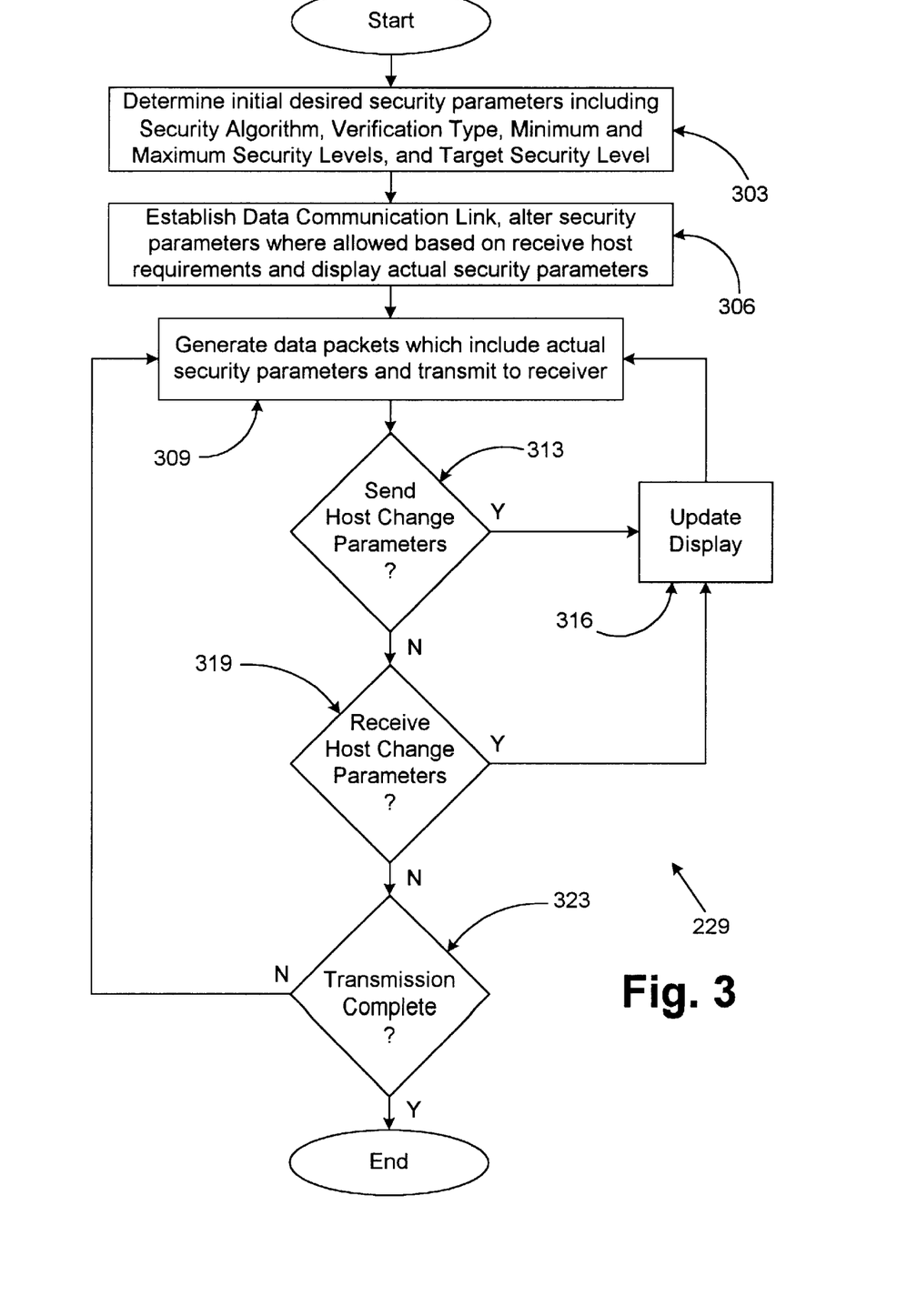
FIG. 3 is a flow chart showing the send host authentication logic of FIG. 2.

Turning next to FIG. 3, shown is flow chart which depicts the send host authentication logic 229. The send host authentication logic 229 begins with block 303 in which the desired security configuration is determined and displayed on the output display device 136 (FIG. 1). The desired security configuration may include the desired security algorithm, the desired verification type, the minimum security level, the target security level, and the actual security level. The actual security level may initially be set equal to the target security level until the receive host 103 alters the actual security level due to the lack of available processing resources to accomplish the target security level. These parameters may initially be read from a default security parameters file saved on the data storage device 216 (FIG. 2) or simply entered by the user via the user input interface device 129. Also, during startup, a data stream priority level is communicated from the send host 103 to the receive host 106 which is used by the receive host 106 in allocating processor resources or SOPS to the number of data streams received at any given moment. Note that the priority level may also be included as a data field in the authentication header 126 (FIG. 1) and may be altered by the user at the send host 103. The priority level is also displayed on the display device 136.

Next, in block 306, the send host 103 (FIG. 1) establishes a data communications link with the receive host 106 (FIG. 1) undergoing an initial training procedure in which the desired security parameters are communicated from the send host 103 to the receive host 106. The receive host 106 evaluates its capacity to verify the data packets 143 (FIG. 1) to be communicated according to the desired security configuration, and, if the receive host 106 has the necessary available SOPS, the verification of the data stream is performed according to the desired security configuration. If the requisite SOPS are not available, then the receive host 106 will determine and send an actual security configuration back to the send host 103 if the desired security configuration allows such parameters to be varied by the receive host 106. The actual security configuration may include, for example, the actual security algorithm, the actual verification type, and the actual security level. If the desired security configuration does not allow such changes, then the data link will be rejected by the receive host 106. The actual security parameters are then displayed on the output display device 130 (FIG. 2), if the data stream is accepted by the receive host 106.

The send host authentication logic 229 then progresses to block 309 in which the data packets 143 (FIG. 1) are assembled with the authentication data block 139 (FIG. 1) which includes the authentication header 126 (FIG. 1) and the signature block 119 (FIG. 1). The signature block 119 (FIG. 1) is generated using the actual security algorithm which is the same as the desired security algorithm specified in the desired security configuration unless altered by the receive host 106. The data packets 143 are communicated to the receive host 106.

Next in block 313, the send host authentication logic 229 determines whether the desired security configuration has been changed by the user via the user input interface device 129 (FIG. 2). If such a change has been made, then the send host authentication logic 229 progresses to block 316. If not, then the send host authentication logic 229 progresses to block 319. In block 319, the send host authentication logic 229 determines whether any of the actual security parameters have been changed by the receive host 319. If such a change has been made, then the send host authentication logic 229 moves to block 316. In block 316, the desired and actual security parameters displayed by the output display device 136 are altered to reflect any changes made. Thereafter, the send host authentication logic 229 reverts back to block 309 in which the data packets 143 are generated using the new security parameters. According to the preferred embodiment, the actual security level may be altered by the send host 103 as initiated by the user, for example, whereas the verification type and the security algorithm may not be changed by the send host 103 after the startup of data communication because the receive host 106 controls these parameters.

If in block 319, the receive host 106 does not change any of the actual security parameters, then the send host authentication logic 229 progresses to block 323 where it is determined whether the transmission of the data stream is complete. If the transmission is not complete, the send host authentication logic 229 reverts back to block 309 to continue to generate and communicate data packets. If the transmission of the data stream is complete in block 323, then the send host authentication logic 229 ends. Thus, the send host authentication logic 229 ultimately establishes an actual security configuration by which the data stream is communicated and reacts to any changes in the security parameters of the actual security configuration initiated by either the user or by the receive host 106. In this manner, the security configuration adapts over time to facilitate optimum data transmission speed while providing adequate security.

Figure 4:
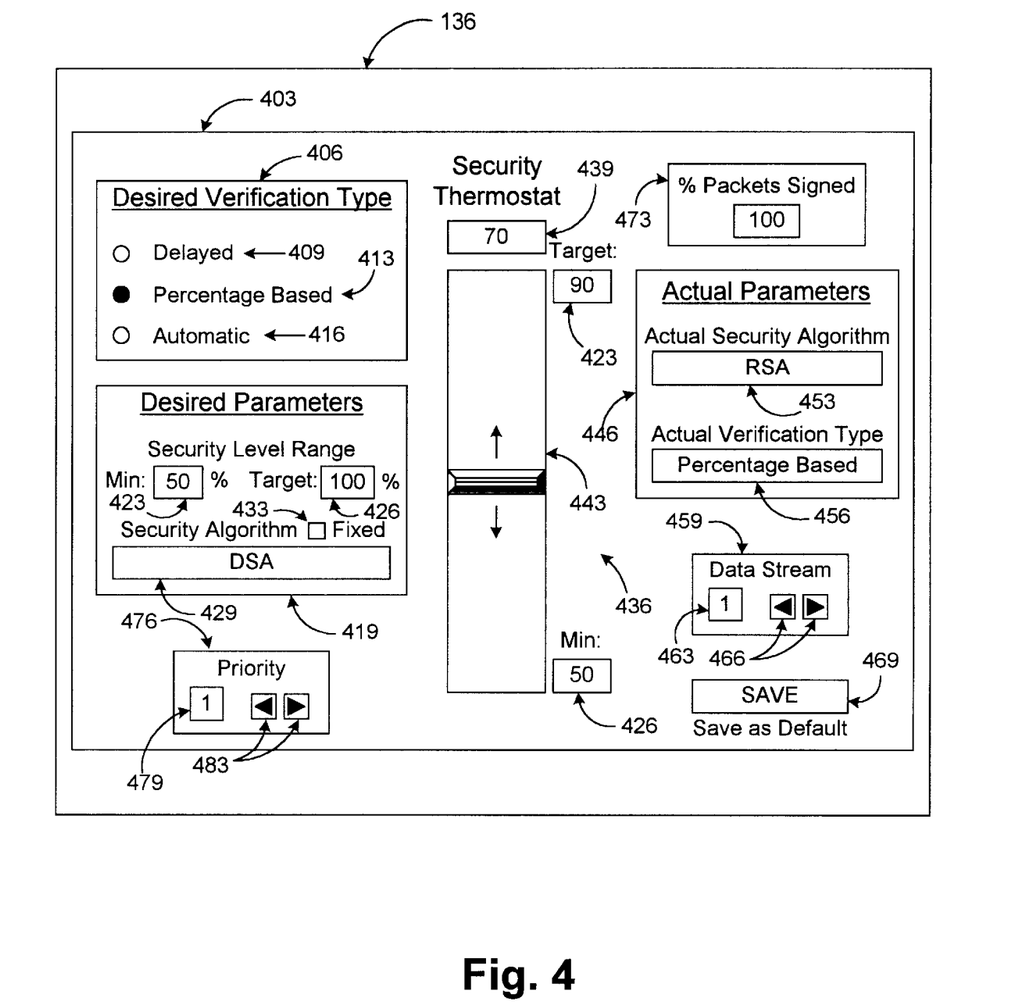
FIG. 4 is a drawing of the output display of FIG. 2.

With reference to FIG. 4, shown is an output display screen 403 appearing on the output display device 136, which may be a CRT, for example, or other suitable display device or devices. The output display screen 403 includes a desired verification type block 406 in which one may toggle between delayed verification 409, percentage based verification 413, and automatic verification 416. Where delayed verification 409 or percentage based verification 413 are chosen, the receive host (FIG. 1) is forced to employ the desired verification type chosen and may not switch to an alternative verification type. Where automatic verification 416 is chosen, the actual verification type can be determined by the receive host (FIG. 1) based on availability of SOPS, etc. Preferably, the receive host 106 will attempt to establish percentage based verification before delayed verification due to a greater reliability and a lesser susceptibility to delays, when the desired security configuration allows the receiver to select the verification type. Generally, delayed verification is employed when percentage based verification cannot be accommodated by the receive host 106.

The output display screen 403 also includes a desired parameters block 419 which displays a desired security level range which includes a minimum security level 423 and a target security level 426 which may be entered with the user input interface 129 (FIG. 2) such as a keyboard for example. The desired parameters block 419 also includes a desired security algorithm 429 and a fixed block 433. The desired parameters block 419 may offer a pull down list of security algorithms within which one may chose a particular algorithm to be employed. The fixed block 433 indicates whether the receive host 106 may specify an actual security algorithm other than that chosen by the user as indicated by the desired security algorithm 429.

The output display screen 403 also includes a security thermostat 436 which includes a slide control 443 that indicates the actual security level 439 between the minimum and target security levels 423 and 426. Note that the slide control may be moved up and down with, for example, a mouse which guides a pointer on the output display screen. Next to the security thermostat 436 is an actual parameters block 446 which shows an actual security algorithm 453 and an actual verification type 456. The actual security algorithm 453 and the actual verification type 456 are those dictated by the receive host 106 (FIG. 1) based on SOPS availability. If enough SOPS are available to implement the desired parameters, then the parameters in the actual parameters block 446 would mirror the desired parameters in the desired verification type block 406 and the desired parameters block 419.

In addition, the output display screen 403 features a data stream identifier block 459 in which includes a current data stream indicator 463 with toggle buttons 466. The toggle buttons 466 increase or decrease the value in the current data stream indicator 463. The current data stream indicator 463 indicates the particular data stream for which parameters are displayed on the output display screen 403 at a given time in which the send host 103 is communicating two or more data streams to two or more receive hosts 106.

The output display screen 403 includes a default configuration save button 469 which causes the current desired security parameters as reflected in the desired verification type block 406, the desired parameters block 419, and the security thermostat 436 to be saved to the data storage device 216. In the preferred embodiment, this default configuration is employed whenever a new data stream is initiated, where the various default parameters may be altered as the user sees fit.

The output display screen further includes a packet signed percentage block 473 which indicates a percentage of data packets 109 (FIG. 1) for which a signature block 119 (FIG. 1) is generated. This value may be less than one hundred percent when processor resources are stressed in the send host 106 (FIG. 1), thereby reducing the demand for processor resources for the signature generation.

Finally, the output display screen features a priority selection block 476 with a priority indicator 479 and priority indicator toggle buttons 483. The priority of a particular data stream may be chosen by the user by manipulating the toggle buttons 483 with a button on a mouse (not shown). In this manner, one may alter the priority of the particular data stream.

Figure 5:
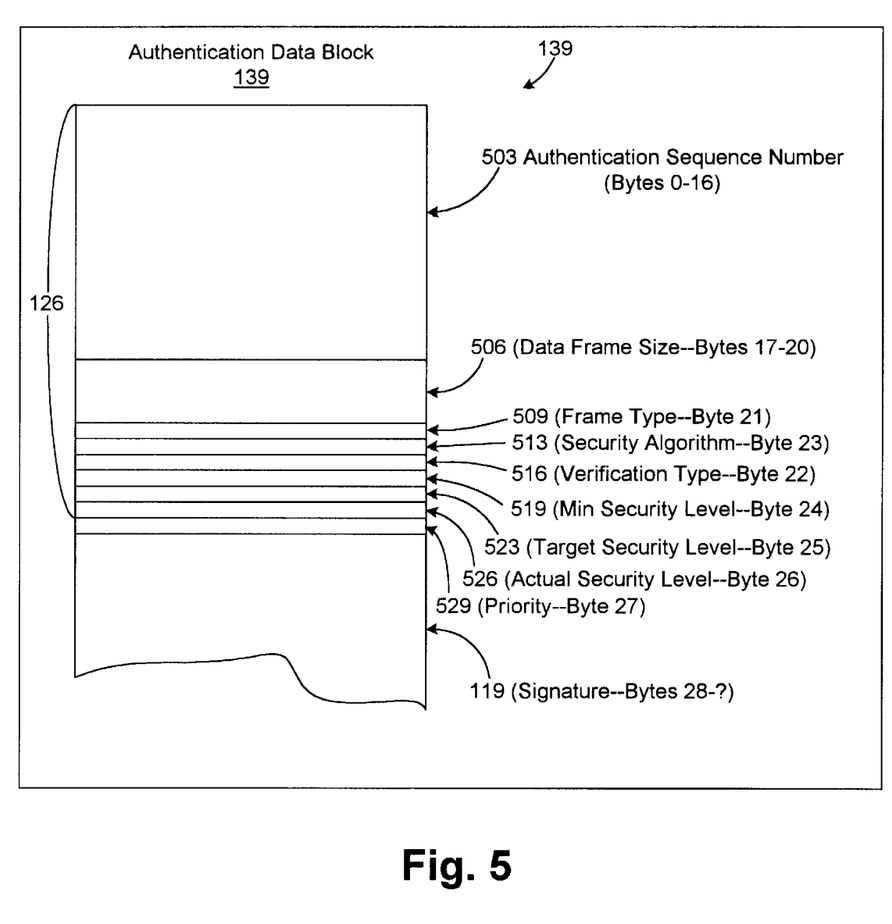
FIG. 5 is a drawing of an authentication data block generated by the send host of FIG. 2.

Turning then, to FIG. 5, shown is the authentication data block 139. The authentication data block 139 includes the authentication header 126 with various data fields to communicate the various security parameters discussed previously as well as additional parameters. It is understood that the particular order and size of the data fields as shown herein is as an example as other sizes and orders may be employed. The authentication header 126 includes an authentication sequence number field 503 which uses bytes 0–16. The authentication sequence number field 503 is employed to keep track of the order in which data packets are authenticated and received. Next, a data frame size field 506 occupying bytes 17–20 is specified which indicates the size of the authentication data block 139. A frame type field 509 which occupies the $21^{st}$ byte is specific to an encoding employed, for example, I, B, or P frames as in MPEG encoding, which is known in the art.

Next, a security algorithm field 513 is specified in byte 23 which indicates the actual security algorithm 513 employed by the receive host 106 (FIG. 1). In byte 24 is a verification type field 516 which indicates the actual verification type employed by the receive host 106. In byte 25, a security level minimum field 519 is defined which indicates the minimum security level or verification percentage to be performed by the receive host 106. Note that the minimum security level can not be changed by the receive host 106 so that a minimum level of verification is maintained as desired by the user. Next is a target security level field 523 which occupies byte 25 and specifies the target security level. The target security level is set by the send host 103 while the receive host 106 attempts to meet this level. The target security level field 523 is followed by an actual security level field 526 which occupies byte 26 of the authentication data block 139. The actual security level 526 may be determined by the receive host 106 in light of available processor resources, or the user at the send host 103 may manually change the actual security level 526 via the security thermostat 436. Byte 27 is occupied by a priority field 529 which holds the actual priority assigned to the data stream. Finally, the signature block 119 follows the priority field 529 and is of variable length depending upon the particular security algorithm employed.

Figure 6:
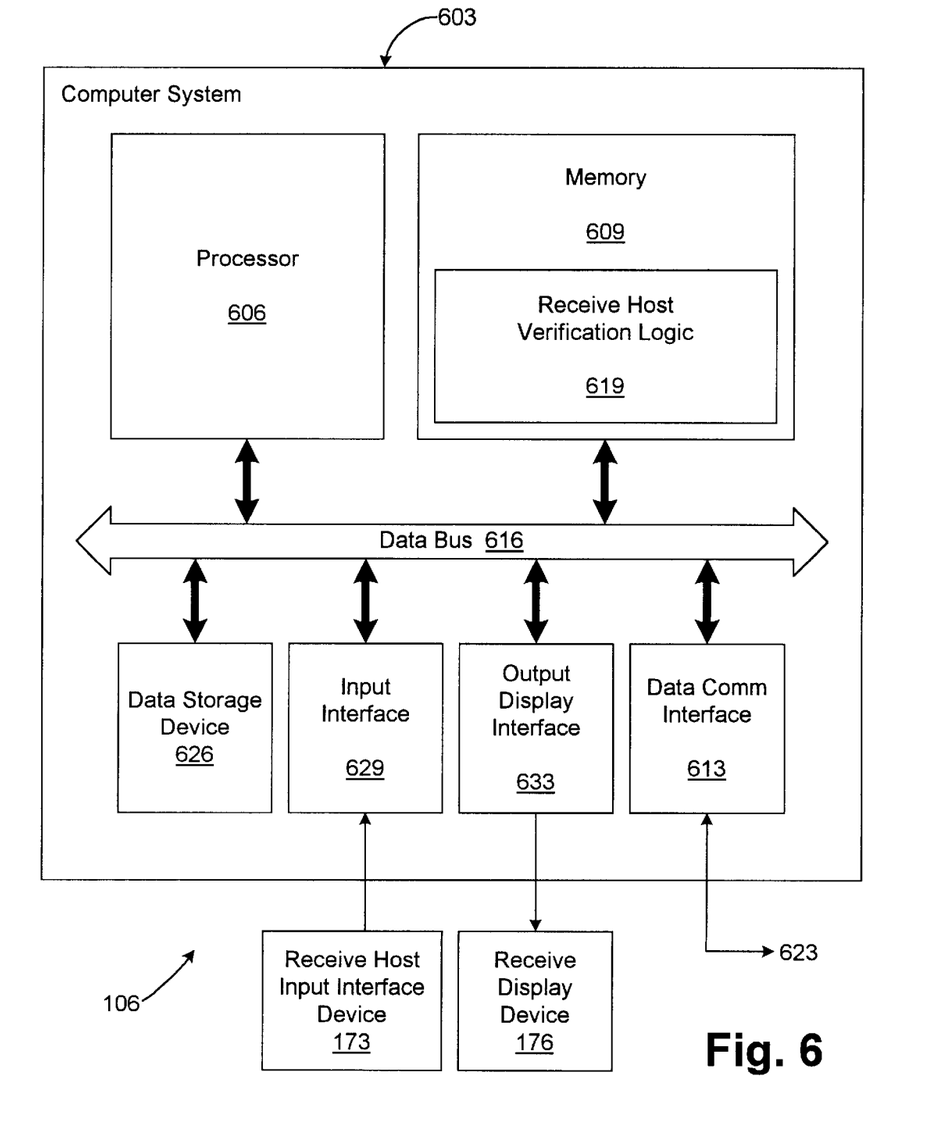
FIG. 6 is block diagram of the receive host of FIG. 1.

Turning next to FIG. 6, shown is a block diagram of the receive host 106 (FIG. 1). The receive host 106 is comprised of a computer system 603 which includes a processor 606, a memory 609, and a data communication interface 613. The processor 606, memory 609, and data communication interface 613 are all electrically coupled to a data bus 616. The processor 606 operates according to receive host verification logic 619 stored on the memory 609. The data communication interface 613 is adapted to be electrically coupled to a number of channels 623 through which the receive host 106 may communicate with any number of send hosts 103. The receive host 106 further includes a data storage device 626, an input interface 629, and an output display interface 633, all of which are electrically coupled to the data bus 616. The input interface 629 is also electrically coupled to receive host input interface device 173 such as a keyboard or mouse. Similarly, the output display interface 633 is electrically coupled to the receive display device 176 which may be a CRT or other similar device. The receive display device 176 features the output display screen 403 (FIG. 4) to inform the end user of the operation of the receive host 106.

Figure 7:
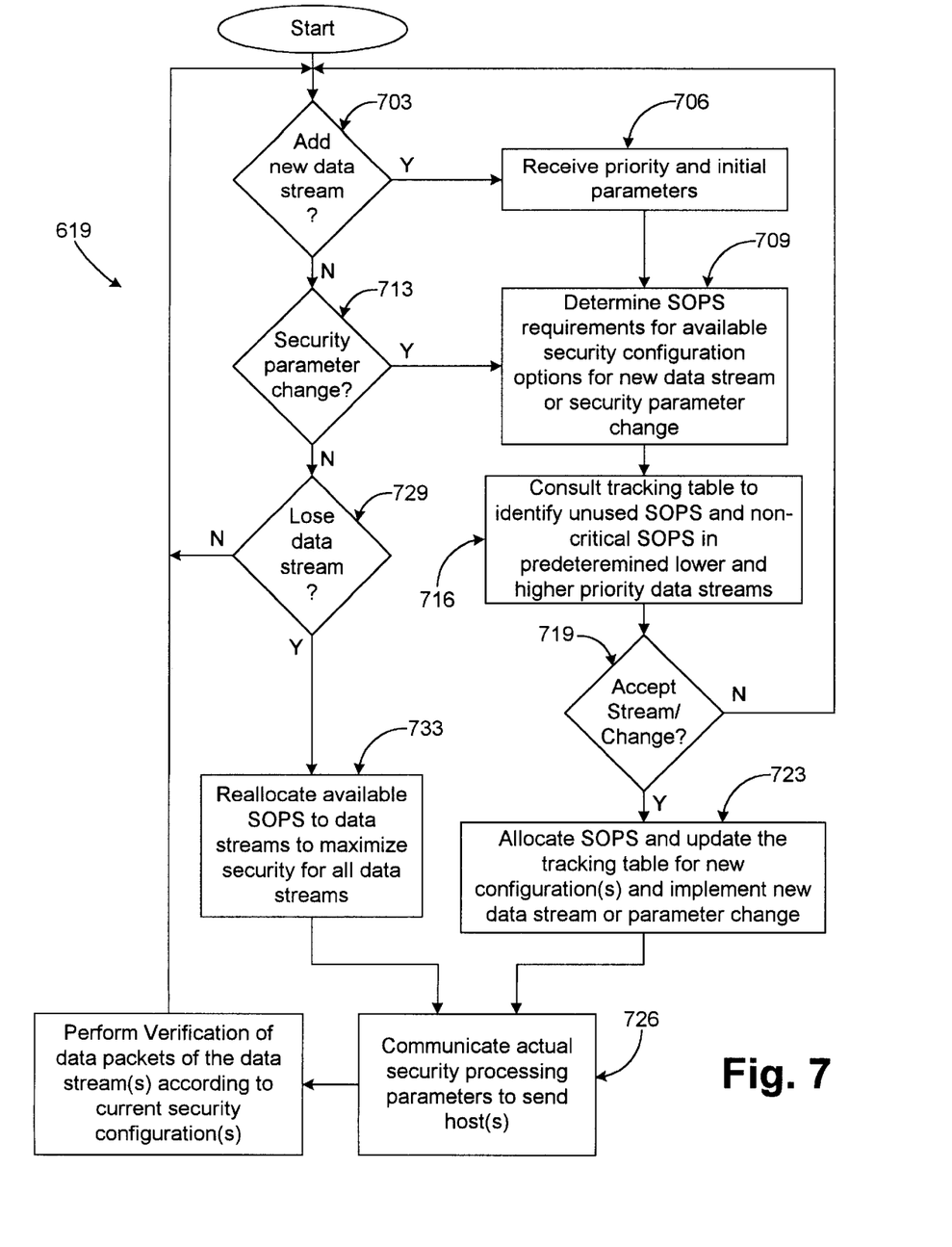
FIG. 7 is a flow chart showing the receive host authentication logic of FIG. 6.

Referring then, to FIG. 7, shown is a flow chart which depicts the receive host verification logic 619. The receive host verification logic 619 begins with block 703 in which it is ascertained whether a particular send host 103 (FIG. 1) is attempting to establish secure data communication with the receive host 106 (FIG. 1). If so, the receive host verification logic 619 progresses to block 706 in which in which the receive host 106 is provided with the priority value for the data stream and the desired parameters including the security algorithm, verification type, minimum and target security levels, and an initial actual security level which may equal, for example, the target security level. Thereafter, the receive host verification logic 619 proceeds to block 709.

If in block 703 there is no new data stream to be received, then the receive host verification logic 619 proceeds to block 713 in which it is determined if any of the desired security parameters, specifically the actual security level, has been changed by the user at the send host 103. If any security parameters have changed, then the receive host verification logic 619 moves to block 709.

In block 709, the receive host verification logic 619 evaluates either the potential new data stream based on the parameters received in block 706, or the change in the actual security level or other security parameters detected in block 713 to determine how many SOPS are required by the new data stream or the security parameter change in an existing data stream. Generally, such information is stored in a tracking table in the memory 609 that may include values which indicate the data stream priority, an amount of SOPS necessary to maintain the minimum security level, the amount of SOPS consumed to maintain the actual security level, and the amount of SOPS necessary to achieve the target security level for each existing data stream received by the receive host. The tracking table may also be stored on the data storage device 626 or other suitable storage device.

Thereafter, the receive host verification logic 619 progresses to block 716 where the tracking table is consulted to determine how many SOPS are available to accommodate the potential new data stream or the desired change in the actual security level. In particular, the receive host verification logic 619 identifies how many unused SOPS are available and how many non-critical SOPS may be diverted from the verification processing of other data streams to facilitate the potential new data stream or the change in the actual security level. Non-critical SOPS are those used to perform a percentage based verification at an actual security level which is greater than the minimum security level for a particular data stream. That is to say, non-critical SOPS may be diverted from the verification processing of a particular data stream and the minimum security level can be maintained for that data stream.

The receive host verification logic 619 then progresses to block 719 in which it is determined whether there are enough unused SOPS and non-critical SOPS as indicated by the tracking table which may be diverted to accommodate the new data stream or the security parameter change. If such is the case, then the receive host verification logic 619 proceeds to block 723. If not, then the new data stream is rejected and/or the security parameter change is not implemented and the receive host verification logic 619 reverts back to block 703. For example, if one attempts to increase the actual security level by manipulating the security thermostat 436 (FIG. 4), then the receive host 106 will attempt to facilitate the increase in the actual security level. If the receive host 106 cannot achieve the higher security level using percentage based verification, then the receive host 106 may automatically switch the verification type to delayed verification to accommodate a security level of one hundred percent.

In block 723, the previously identified non-critical SOPS and any unused SOPS are diverted to accommodate the new data stream and/or the security parameter change. The tracking table is updated with the new allocation for each altered data stream including the new data stream if one is implemented. Thereafter, the receive host verification logic 723 progresses to block 726.

Referring back at block 713, if there is not change to the security parameters, then the receive host verification logic 619 proceeds to block 729 in which it is determined whether the communication of any current data stream has terminated. If such is not the case, then the receive host verification logic 619 reverts back to block 703. If a current data stream has ceased communication in block 729, then the receive host verification logic 619 progresses to block 733. In block 733, the SOPS which were employed in processing the now terminated data stream are reallocated to the existing data streams to maximize security for all of the data streams. Thereafter, the receive host verification logic 619 continues to block 726.

In block 726, the security parameters for all data streams which are new or altered due to the allocation or reallocation of the SOPS in blocks 723 and 733 are communicated to their respective send host(s) 103. Next, in block 736, the verification of the data packets of the current data streams are performed according to the security parameters determined for each data stream. Thereafter, the receive host verification logic 619 reverts back to block 703.

Note that the receive host verification logic 619 operates in a continuous loop searching for changes in the status quo of the processing of the data streams and reacts to changes by either reallocating processor resources (SOPS) to accommodate a change, or rejecting such changes altogether and maintaining the status quo.

Figure 8:
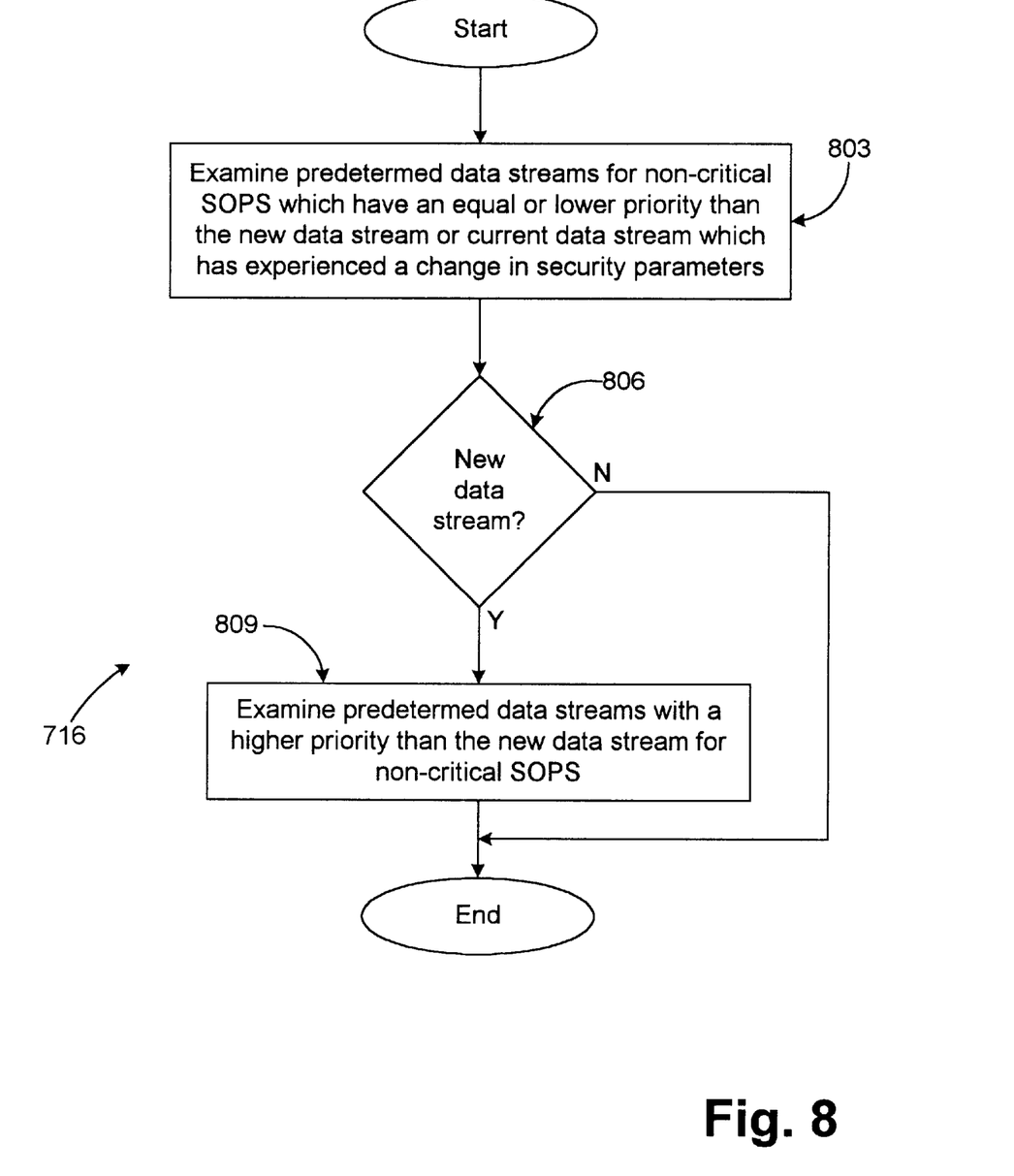
FIG. 8 is a flow chart of a SOPS identification subroutine of FIG. 7.

Finally, referring to FIG. 8, shown is a flow chart of the non-critical SOPS identification subroutine 716. The subroutine 716 executes the logical steps taken in identifying non-critical SOPS with which to accommodate a change in security parameters of an existing data stream or to accommodate a new data stream. Beginning with block 803, the resource tracking table is consulted looking for predetermined existing data streams with a priority that is equal to or lower than the priority of the new data stream or the changed data stream are examined to determine the quantity of non-critical SOPS in each. The predetermined number of lower priority data streams may be, for example, a predefined number of data streams starting from the lowest priority up, or the predetermined number of lower priority data streams may be determined at random. The predetermined number of data streams examined may include all of the lower priority data streams if there are not too many to examine.

Next, in block 806 if a new data stream is sought to be implemented, then the subroutine 716 progresses to block 809. If a new data stream is not to be implemented in block 806, then the subroutine 716 ends. In block 809, predetermined data streams with a higher priority than the new data stream are examined for non-critical SOPS. The predetermined data streams examined may be, for example, a specific number of data streams starting from the highest priority down, or a random sampling of the higher priority data streams. The predetermined number of data streams examined may include all of the higher priority data streams if there are not too many to examine within an acceptable time period. Thereafter, the subroutine ends.

Note that both the send host authentication logic 229 and the receive host verification logic 619 of the present invention can be implemented in hardware, software, firmware, or a combination thereof. In the preferred embodiment(s), both the send host authentication logic 229 and the receive host verification logic 619 are implemented in software or firmware that is stored in a memory and that is executed by a suitable instruction execution system.

The flow charts of FIGS. 3, 7, and 8 show the architecture, functionality, and operation of a possible implementation of the adaptive security software employed by the send host 103 (FIG. 2) and the receive host 106 (FIG. 6). In this regard, each block represents a module, segment, or portion of code, which comprises one or more executable instructions for implementing the specified logical function(s). It should also be noted that in some alternative implementations, the functions noted in the blocks may occur out of the order noted in FIGS. 3, 7, and 8. For example, two blocks shown in succession in FIGS. 3, 7, and 8 may in fact be executed substantially concurrently or the blocks may sometimes be executed in the reverse order, depending upon the functionality involved, as will be further clarified hereinbelow.

In addition, the send host authentication logic 229 (FIG. 3) and the receive host verification logic 619 (FIGS. 7 and 8), each of which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A send host employing adaptive security, comprising:
   a processor coupled to a data bus;
   a memory coupled to the data bus;
   an input device coupled to the data bus to input a desired security configuration for a data stream to be communicated to a receive host;
   an output device coupled to the data bus to display an actual security configuration for the data stream, the actual security configuration being received from the receive host; and
   adaptive security logic stored on the memory and executable by the processor, the adaptive security logic including logic to generate a plurality of data packets associated with the data stream, the data packets including an authentication data block with an authentication header containing the actual security configuration and a signature, the actual security configuration being based upon a number of available security operations in the receive host.

2. The send host of claim 1, wherein the desired security configuration is displayed on the output device.

3. The send host of claim 1, wherein the actual security configuration is displayed on the output device.

4. The send host of claim 1, wherein the minimum verification level in the authentication header indicates a minimum percentage of the data packets that are decrypted.

5. The send host of claim 1, wherein the minimum verification level in the authentication header indicates a minimum percentage of the data packets that are authenticated to verify a source of the data packets.

6. A send host employing adaptive security, comprising:
   a processor coupled to a data bus;
   a memory coupled to the data bus;
   an input device coupled to the data bus to input a desired security configuration for a data stream to be communicated to a receive host;
   an output device coupled to the data bus to display an actual security configuration for the data stream, the actual security configuration being received from the receive host; and adaptive security logic stored on the memory and executable by the processor, the adaptive security logic including:

logic to generate a plurality of data packets associated with the data stream, the data packets including an authentication data block with an authentication header containing the actual security configuration and a signature; and security thermostat logic to control an actual security level, the actual security level being included in the authentication header.

7. A send host employing adaptive security, comprising:
a processor coupled to a data bus;
a memory coupled to the data bus;
an input device coupled to the data bus to input a desired security configuration for a data stream to be communicated to a receive host;
an output device coupled to the data bus to display an actual security configuration for the data stream, the actual security configuration being received from the receive host; and
adaptive security logic stored on the memory and executable by the processor, the adaptive security logic including:
logic to generate a plurality of data packets associated with the data stream, the data packets including an authentication data block with an authentication header containing the actual security configuration and a signature; and
logic to place a minimum security level in the authentication header.

8. A send host employing adaptive security, comprising:
a processor coupled to a data bus;
a memory coupled to the data bus;
an input device coupled to the data bus to input a desired security configuration for a data stream to be communicated to a receive host;
an output device coupled to the data bus to display an actual security configuration for the data stream, the actual security configuration being received from the receive host; and
adaptive security logic stored on the memory and executable by the processor, the adaptive security logic including logic to generate a plurality of data packets associated with the data stream, the data packets including an authentication data block with an authentication header containing the actual security confirmation and a signature, wherein the desired security configuration comprises a desired verification type, a minimum security level, a target security level, a security algorithm, and an actual security level.

9. A receive host employing adaptive security, comprising:
a processor coupled to a data bus;
a memory coupled to the data bus;
a data communications interface coupled to the data bus, the data communications interface being configured to receive at least one data stream comprising a number of data packets, the data packets including an authentication data block, the authentication data block having an authentication header and a signature; and
adaptive security logic stored on the memory and executable by the processor, the adaptive security logic including logic including:

logic to decompose the authentication header in the data packets;
logic to perform a variable percentage verification on the data packets from the data stream; and
logic to determine an actual verification percentage performed based on a number of available security operations in the receive host, a minimum security level, and a target security level, the minimum security level and the target security level being contained in the authentication header.

10. The receive host of claim 9, wherein the logic to determine an actual security level further comprises logic to determine the number of available security operations by examining the at least one data stream received by the data communications interface for a non-critical processor time usage.

11. The receive host of claim 9, wherein the adaptive security logic further comprises:
logic to perform a delayed verification on a bundle of data packets from the data stream; and
logic to enable one of the delayed verification and the variable percentage verification based on a verification type field contained in the authentication header and on the number of available security operations in the receive host.

12. The receive host of claim 9, wherein the adaptive security logic further comprises logic to maintain a resource tracking table which indicates the number of security operations required to accomplish the minimum security level, the target security level, and the actual security level, as well as a priority level of the at least one data stream.

13. The receive host of claim 9, wherein the logic to perform a variable percentage verification on the data packets from the data stream further comprise logic to decrypt a variable percentage of the data packets.

14. The receive host of claim 9, wherein the logic to perform a variable percentage verification on the data packets from the data stream further comprise logic to authenticate a variable percentage of the data packets.

15. A send host employing adaptive security, comprising:
means for inputting a desired security configuration for a data stream to be communicated to a receive host;
means for displaying the desired security configuration and an actual security configuration for the data stream, the actual security configuration being received from the receive host; and
means for generating a plurality of data packets associated with the data stream, the data packets including a data block and an authentication data block having an authentication header containing the actual security configuration and a signature the actual security configuration being based upon a number of available security operations in the receive host.

16. A receive host employing adaptive security, comprising:
means for receiving at least one data stream comprising a number of data packets, the data packets including an authentication data block, the authentication data block having an authentication header and a signature;
means for decomposing the authentication header in the data packets;
means for performing a percentage based verification on the data packets from the data stream; means for determining an actual security level performed based on a number of available security operations, a minimum security level, and a target security level, and a desired actual security level, the minimum security level and the target security level being contained in the authentication header; and means for communicating the actual security level to a send host.

17. The receive host of claim 16, wherein the means for determining an actual security level further comprises means for determining the number of available security operations by examining a resource tracking table for a non-critical processor time usage of at least one existing data stream.

18. The receive host of claim 16, further comprising:

means for performing a delayed verification on a bundle of data packets from the data stream; and means for enabling one of the delayed verification and the variable percentage verification based on a verification type field contained in the authentication header and on the number of available security operations in the receive host.

19. A method for communicating a data stream employing adaptive security, comprising the steps of:

identifying a desired verification type, a desired security algorithm, a minimum security level, a target security level, and a desired actual security level in a send host for communicating a data stream from the send host to a receive host;

determining an actual verification type, an actual security algorithm, and an actual security level in the receive host based on the desired verification type, desired security algorithm, minimum security level, target security level, and a number of available security operations;

communicating the actual verification type, the actual security algorithm, and the actual security level from the receive host to the send host;

generating a plurality of data packets associated with the data stream in the send host, the data packets having an authentication data block with an authentication header, the authentication header containing the actual verification type, actual security algorithm, minimum security level, the target security level, and the actual security level;

verifying the data packets using percentage based verification if the actual verification type is percentage based verification, the percentage based verification being performed at the actual security level which is greater than or equal to the minimum security level and less than or equal to the target security level; and performing a delayed verification on the data packets if the actual verification type is delayed verification.

20. The method of claim 19, further comprising the step of altering the actual security level in the send host using a security thermostat.

21. The method of claim 19, further comprising the step of identifying the number of available security operations by identifying a number of non-critical security operations employed by a plurality of second data streams received by the receive host, and by identifying a number of unused security operations in the receive host.

22. A computer program embodied on a computer-readable medium for operation in a send host to facilitate data communication with adaptive security, comprising:

logic to input a desired security configuration for a data stream to be communicated to a receive host;

logic to display a desired security configuration and an actual security configuration for the data stream, the actual security configuration being received from the receive host; and logic to generate a plurality of data packets associated with the data stream, the data packets including an authentication data block having an authentication header containing the actual security configuration and a signature, the actual security configuration being based upon a number of available security operations in the receive host.

23. A computer program embodied on a computer-readable medium for operation in a receive host to facilitate data communication with adaptive security, comprising:

logic to receive at least one data stream comprising a number of data packets, the data packets including an authentication data block, the authentication data block having an authentication header and a signature;

logic to decompose the authentication header in the data packets;

logic to perform a percentage based verification on the data packets from the data stream;

logic to determine an actual security level performed based on a number of available security operations in a receive host, a minimum security level, and a target security level, the minimum security level and the target security level being contained in the authentication header; and logic to communicate the actual security level to a send host.

24. The computer program embodied on a computer-readable medium of claim 23, wherein the logic to determine the actual security level further comprises logic to determine the number of available security operations by examining a resource tracking table for a non-critical processor time usage of at least one existing data stream.

25. The computer program embodied on a computer-readable medium of claim 23, further comprising:

logic to perform a delayed verification on a bundle of data packets from the data stream; and logic to enable one of the delayed verification and the variable percentage verification based on a verification type field contained in the authentication header and on the number of available security operations in the receive host.

26. A computer program embodied in a modulated data signal for transmission across a network, the computer program being for operation in a send host to facilitate data communication with adaptive security, comprising:

logic to input a desired security configuration for a data stream to be communicated to a receive host;

logic to display the desired security configuration and an actual security configuration for the data stream, the actual security configuration being received from the receive host; and logic to generate a plurality of data packets associated with the data stream, the data packets including an authentication data block having an authentication header containing the actual security configuration and a signature, the actual security configuration being based upon a number of available security operations in the receive host.

27. A computer program embodied in a modulated data signal for transmission across a network, the computer program being for operation in a receive host to facilitate data communication with adaptive security, comprising:

logic to receive at least one data stream comprising a number of data packets, the data packets including an authentication data block, the authentication data block having an authentication header and a signature;

logic to decompose the authentication header in the data packets;

logic to perform a percentage based verification on the data packets from the data stream;

logic to determine an actual security level performed based on a number of available security operations, a minimum security level, and a target security level, the minimum security level, the target security level being contained in the authentication header; and logic to communicate the actual security level to a send host.

28. The computer program embodied in a modulated data signal of claim 27, wherein the logic to determine an actual security level further comprises logic to determine the number of available security operations by examining said at least one data stream received by the input device for a non-critical processor time usage.

29. The computer program embodied in a modulated data signal of claim 27, further comprising:

logic to perform a delayed verification on a bundle of data packets from the data stream; and logic to enable one of the delayed verification and the variable percentage verification based on the number of available security operations and on a verification type in the authentication header.

30. A send host employing adaptive security, comprising:

logical circuitry to input a desired security configuration for a data stream to be communicated to a receive host;

logical circuitry to receive an actual security configuration for the data stream, the actual security configuration being received from the receive host, the actual security configuration being based upon a number of available security operations in the receive host; and logical circuitry to generate a plurality of data packets associated with the data stream, the data packets including a data block and an authentication data block having an authentication header containing the actual security configuration and a signature.

31. A receive host employing adaptive security, comprising:

logical circuitry to receive at least one data stream comprising a number of data packets, the data packets including an authentication data block, the authentication data block having an authentication header and a signature;

logical circuitry to decompose the authentication header in the data packets;

logical circuitry to perform a percentage based verification on the data packets from the data stream;

logical circuitry to determine an actual security level performed based on a number of available security operations, a minimum security level, and a target security level, and a desired actual security level, the minimum security level and the target security level being contained in the authentication header; and logical circuitry to communicate the actual security level to a send host.

32. A receive host employing adaptive security, comprising:

a processor coupled to a data bus;

a memory coupled to the data bus; and a data communications interface electrically coupled to the data bus, the data communications interface being configured to receive at least one data stream comprising a number of data packets;

adaptive security logic stored on the memory and executable by the processor, the adaptive security logic including:

logic to determine a number of available security operations in the receive host; and logic to allocate the number of available security operations in the receive host to perform a verification of a number of the data packets in the at least one data stream.

33. The receive host of claim 32, wherein the logic to determine a number of available security operations in the receive host further comprises logic to determine the number of available security operations based upon a priority assigned to the at least one data stream.

34. The receive host of claim 32, wherein the logic to determine a number of available security operations in the receive host further comprises logic to determine a number of non-critical security operations.

* * * * *